US010698966B2

(12) United States Patent
DeLuca et al.

(10) Patent No.: US 10,698,966 B2
(45) Date of Patent: Jun. 30, 2020

(54) SEARCH RESULT PRIORITIZATION BASED ON DEVICE LOCATION

(71) Applicant: International Business Machines Corporation, Armonk, NY (US)

(72) Inventors: Lisa Seacat DeLuca, Baltimore, MD (US); Steve McDuff, Markham (CA)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/598,538

(22) Filed: May 18, 2017

(65) Prior Publication Data
US 2018/0336211 A1   Nov. 22, 2018

(51) Int. Cl.
| G06F 16/9537 | (2019.01) |
| G06F 16/248 | (2019.01) |
| G06F 16/9535 | (2019.01) |
| G06F 16/2457 | (2019.01) |
| G06Q 30/02 | (2012.01) |

(52) U.S. Cl.
CPC ........ *G06F 16/9537* (2019.01); *G06F 16/248* (2019.01); *G06F 16/24578* (2019.01); *G06F 16/9535* (2019.01); *G06Q 30/0205* (2013.01); *G06Q 30/0261* (2013.01)

(58) Field of Classification Search
CPC ............. G06F 16/9537; G06F 16/9535; G06F 16/24578; G06F 16/248; G06Q 30/0205; G06Q 30/0261
See application file for complete search history.

(56) References Cited

U.S. PATENT DOCUMENTS

| 6,834,195 B2 * | 12/2004 | Brandenberg | G01S 5/02 |
| | | | 455/456.3 |
| 7,565,157 B1 * | 7/2009 | Ortega | H04W 4/029 |
| | | | 455/456.2 |

(Continued)

FOREIGN PATENT DOCUMENTS

| WO | 2015025320 A1 | 2/2015 |
| WO | 2015195415 A1 | 12/2015 |

OTHER PUBLICATIONS

Handover (Ho) date unknown [captured by archive.org on Jan. 2, 2016], techopedia.com, https://web.archive.org/web/20160102225125/https://www.techopedia.com/definition/19726/handover-ho.*

(Continued)

*Primary Examiner* — Jason G Liao
(74) *Attorney, Agent, or Firm* — Stephen R. Yoder; Daniel R. Simek

(57) ABSTRACT

Aspects of the present invention disclose a method, computer program product, and system for prioritizing search engine results based on a current location of a user. The method includes one or more processors determining that a user enters a zone within a venue based on monitoring a computing device of the user moving through the venue. The method further includes one or more processors performing a search, while the user is within the zone, based on a search query input by the user into the computing device of the user while the computing device is within the zone. The method further includes one or more processors prioritizing results of the search to create a set of results that are based on the search query input by the user and the zone within the venue.

19 Claims, 4 Drawing Sheets

(56) References Cited

U.S. PATENT DOCUMENTS

| | | | |
|---|---|---|---|
| 7,774,342 B1 | 8/2010 | Virdy | |
| 8,046,371 B2 | 10/2011 | O'Clair et al. | |
| 8,306,749 B1* | 11/2012 | Petersen | G01C 21/3641 |
| | | | 340/988 |
| 8,341,143 B1* | 12/2012 | Karls | G06F 16/9038 |
| | | | 707/708 |
| 9,264,500 B2 | 2/2016 | Statler et al. | |
| 9,424,598 B1 | 8/2016 | Kraft | |
| 2007/0061363 A1* | 3/2007 | Ramer | G06Q 30/02 |
| 2008/0263024 A1* | 10/2008 | Landschaft | G06F 16/9537 |
| 2011/0276385 A1 | 11/2011 | Keller | |
| 2012/0259732 A1 | 10/2012 | Sasankan et al. | |
| 2013/0331071 A1 | 12/2013 | Statler et al. | |

OTHER PUBLICATIONS

Handoff date unknown [captured by archive.org on Jan. 2, 2016], technopedia.com, https://web.archive.org/web/20160102225107/ https://www.techopedia.com/definition/16851/handoff.*

List of IBM Patents or Patent Applications Treated as Related, Appendix P, Filed Herewith, 2 pages.

DeLuca, et al., "Search Result Prioritization Based on Device Location", U.S. Appl. No. 15/783,065, filed Oct. 13, 2017.

IBM Mobile Innovation Lab, "IBM Ready App for Retail(Summit)", Uploaded by IBM Mobile Innovation Lab Wednesday, Jul. 15, 2016 at 10:53 AM EST, 4 pages, <https://vimeo.com/133562506>.

Zeckman, A., "Google Now Combines Online Shopping With Location-Based Purchasing", Search Engine Watch, May 6, 2014, 14 pages, <https://searchenginewatch.com/sew/news/2343360/google-now-combines-online-shopping-with-location-based-purchasing>.

* cited by examiner

SEARCH RESULT PRIORITIZATION BASED ON DEVICE LOCATION

BACKGROUND

The present invention relates generally to the field of mobile devices, and more particularly mobile device proximity marketing.

Mobile devices can connect brick and mortar retail stores with their online cyber store. Mobile devices can account for the totality of the shopping experience, beginning with using the mobile device to access a store locator to plan a trip to the store.

Mobile device users can stay organized during the trip by using the shopping list compiled on their mobile device. Mobile device users access their phone while shopping to compare prices with other retailers, and when finalizing their purchases through using mobile coupons, or using a mobile payment means. After completing the trip, mobile device users can follow up on the purchases by looking up information about a complementary product. Mobile users access platforms on their mobile device to rate and share their shopping experience with other mobile device users.

Proximity marketing is the localized wireless distribution of advertising content associated with a particular location. Transmissions can be received by individuals in that location who wish to receive the transmissions. Distribution can be via a traditional localized broadcast, or can be specifically targeted to devices known to be in a particular area. Communications may be further targeted to specific groups within a given location. Uses of proximity marketing include distribution of media at concerts, information, gaming, social applications, and advertising.

Proximity marketing can utilize Geographic Information System (GIS) technology and GPS technology. GPS uses satellites that orbit Earth to send information to GPS receivers that are on the ground. The information helps people determine their location. GIS is a software program that helps people use the information that is collected from the GPS satellites.

A (GIS) is a computer system for capturing, storing, checking, and displaying data related to positions on Earth's surface. GIS can show many different kinds of data on one map. GIS is a broad term that can refer to a number of different technologies, processes, and methods. It is attached to many operations and has many applications related to engineering, planning, management, transport/logistics, insurance, telecommunications, and business. For that reason, GIS and location intelligence applications can be the foundation for many location-enabled services that rely on analysis and visualization.

A global positioning system (GPS) is a space-based satellite navigation system that provides location and time information in all weather conditions, anywhere on or near the Earth where there is an unobstructed line of sight to four or more GPS satellites. GPS provides critical capabilities to military, civil, and commercial users around the world. GPS is maintained by the United States government and is freely accessible to anyone with a GPS receiver.

SUMMARY

According to one embodiment of the present invention, a method for prioritizing search engine results based on a current location of a user is provided. The method for prioritizing search engine results may include one or more processors determining that a user enters a zone within a venue based on monitoring a computing device of the user moving through the venue. The method further includes one or more processors performing a search, while the user is within the zone, based on a search query input by the user into the computing device of the user while the computing device is within the zone. The method further includes one or more processors prioritizing results of the search to create a set of results that are based on the search query input by the user and the zone within the venue.

DETAILED DESCRIPTION

Figure 1:
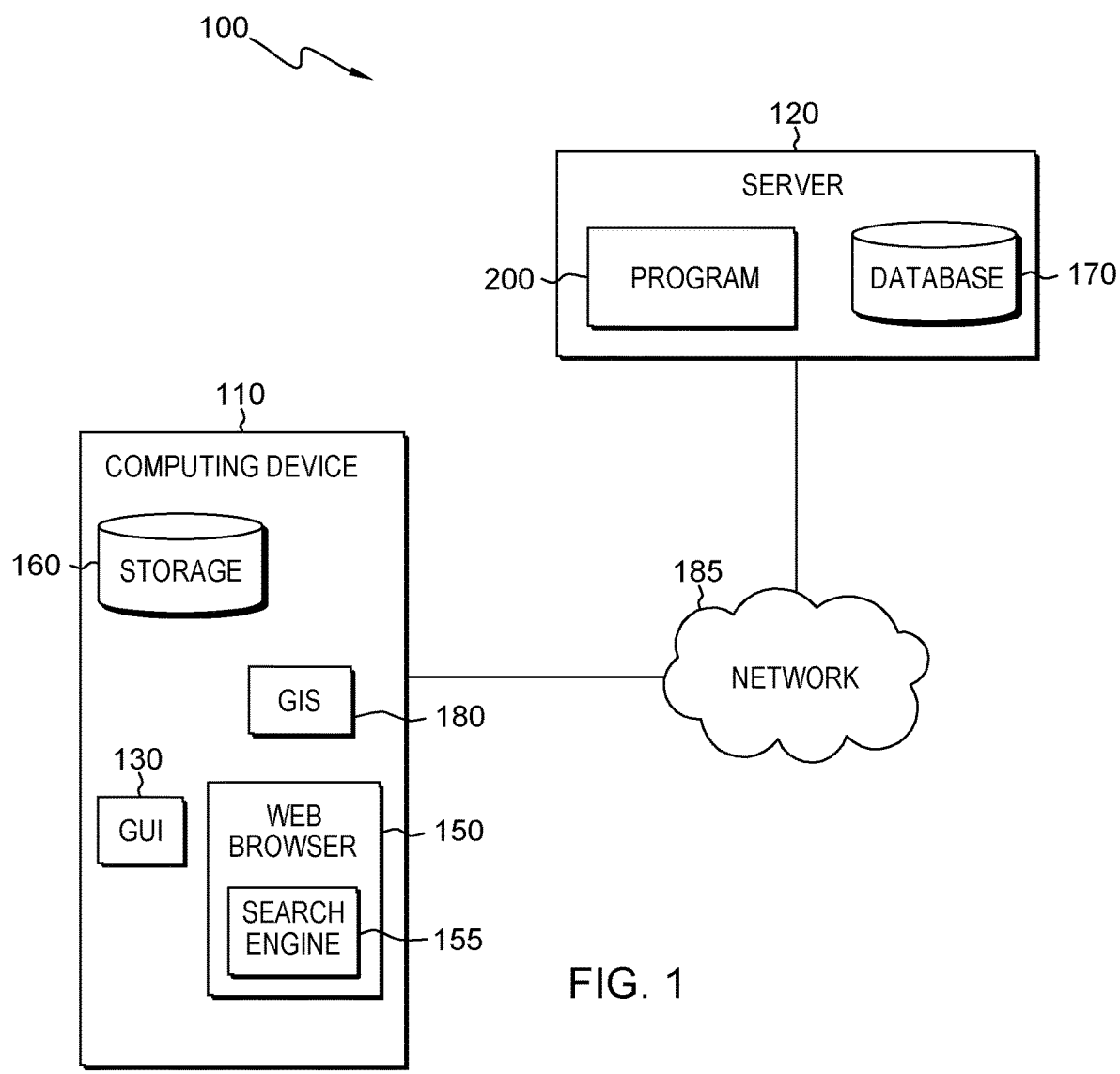
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes computing device 110 and server 120 interconnected over network 185.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, computing device 110 includes graphical user interface (GUI) 130, web browser 150, storage 160, geographic information system (GIS) 180. The various programs on computing device 110 include web browser 150, an electronic mail client, security software (e.g., a firewall program, a geo-locating program, an encryption program, etc.), an instant messaging (IM) application (app), and a communication (e.g., phone) application.

In one embodiment, graphical user interface 130 operates on computing device 110. In another embodiment, graphical user interface 130 operates on another computer in a server based setting, for example on a server computer (e.g., server 120). In yet another embodiment, graphical user interface 130 operates on computing device 110 simultaneously with a server computer interconnected through server 120. Graphical user interface 130 may be any user interface used to access information from computing device 110, such as information gathered or produced by program 200. Additionally, graphical user interface 130 may be any user interface used to supply information to computing device 110, such as information supplied by a user to be used by program 200. In some embodiments, graphical user interface 130 may present web browser 150, used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., web browser 150) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 4, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160, a database, located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device.

Geographic information system (GIS) 180 is a system designed to capture, store, manipulate, analyze, manage, and present all types of geographic data. In general, GIS describes any information system that integrates, stores, edits, analyzes, shares, and displays geographic information. Computing device 110 can allow server 120, through a handshake, to remotely access GIS 180 on computing device 110. In some embodiments, GIS 180, on computing device 110, contains GPS receivers. In other embodiments, GIS 180 contains radio-frequency identification (RFID) tags. In still other embodiments, GIS 180 contains other sensors and/or receivers used by program 200 to determine the location of computing device 110. GIS 180 may utilize GPS or triangulation techniques to determine the physical location of computing device 110.

In another example, GIS 180 may utilize a series of RFID tag readers to locate a server with an RFID tag. GIS 180 contains a globally unique identifier (GUID) that is assigned for each computing device. The GUID can be the MAC address for the device. The device is tracked through the GUID located on GIS 180.

GIS 180 operates to enhance program 200 to increase the accuracy or amount of location-related information that program 200 obtains. GIS 180 utilizes GUID information, combined with a sampling of data collected by GIS 180, to make determinations regarding the location of computing device 110. In an example embodiment, GIS 180 may receive a series of data points collected by the GUID. GIS 180 may use the received data points to create a path, and compare that path to GUID information corresponding to the location of the received data points.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes program 200 and database 170.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a massage to computing device 110 indicating that server 120 wants to establish a communication channel in order to gain access to programs, such as GIS 180, on computing device 110.

Database 170 may be a repository that may be read by geographic information system (GIS) 180. GIS data and information, such as maps, floor plans, geographic information, location names, and other information may be stored to database 170. In some embodiments, GIS 180 may access and retrieve information from database 170. In other embodiments, a program on server 120 (not shown) may prompt and update database 170 with information. The data stored to database 170 may be changed or updated by data input by a user, such as a user with access to server 120. In one embodiment, database 170 resides on server 120. In other embodiments, database 170 may reside on another server, another computing device, or mobile device, provided that database 170 is accessible to GIS 180.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

In one embodiment, program 200 operates on server 120. Program 200 provides the capability to optimize a search engine for shopping based on the current location of a user. Program 200 is capable of utilizing Wi-Fi technology, Bluetooth, Near Field Communication tags (NFC), Global System for Mobile Communications (GSM), and Global Positioning System Technology (GPS) to communicate with the computing device of a user (e.g., computing device 110).

In one embodiment, program 200 tracks the movement of a computing device within a space or region, defined by beacons within a department store. A beacon is broadcasting equipment at a particular location. The beacon sends information to the computing device of a receptive user, which can be text, images, audio or video to enabled computing devices within the range of the beacon.

In an example embodiment, program 200 operates as a code snippet within one or more applications on computing device 110. Code snippets define the scope of interactivity between the snippets and the application, (e.g., program 200 hosted on server 120 interacting with a web browser application on computing device 110). For example, program 200 is a function within web browser 150, and the processes of program 200 occur automatically (i.e., without user intervention) during operation of web browser 150 as initiated by program 200. The dynamic code snippet elements provide scripting support. The variables enable dialog between program 200, through server 120, graphical user interface 130, and web browser 150.

In one embodiment, program 200 has the ability to access web browser 150 of computing device 110 to initiate a search engine to provide results that are ordered based upon the location of a user within a designated zone. In this embodiment, program 200 can determine and track the location of a user within defined zones. Program 200 generates a search engine that prioritizes data based on the location of a user and the preferences of the provider or the user.

In another embodiment, program 200 has the ability to automatically populate the web browser of a user with real-time information directed to indoor navigation. In this example, program 200 can provide a user with shopper traffic density information, the real-time location of sales staff, and the average wait time for waiting in line for a register. A store can also provide information related to the peak and low periods of both shopper and staff traffic.

Figure 2:
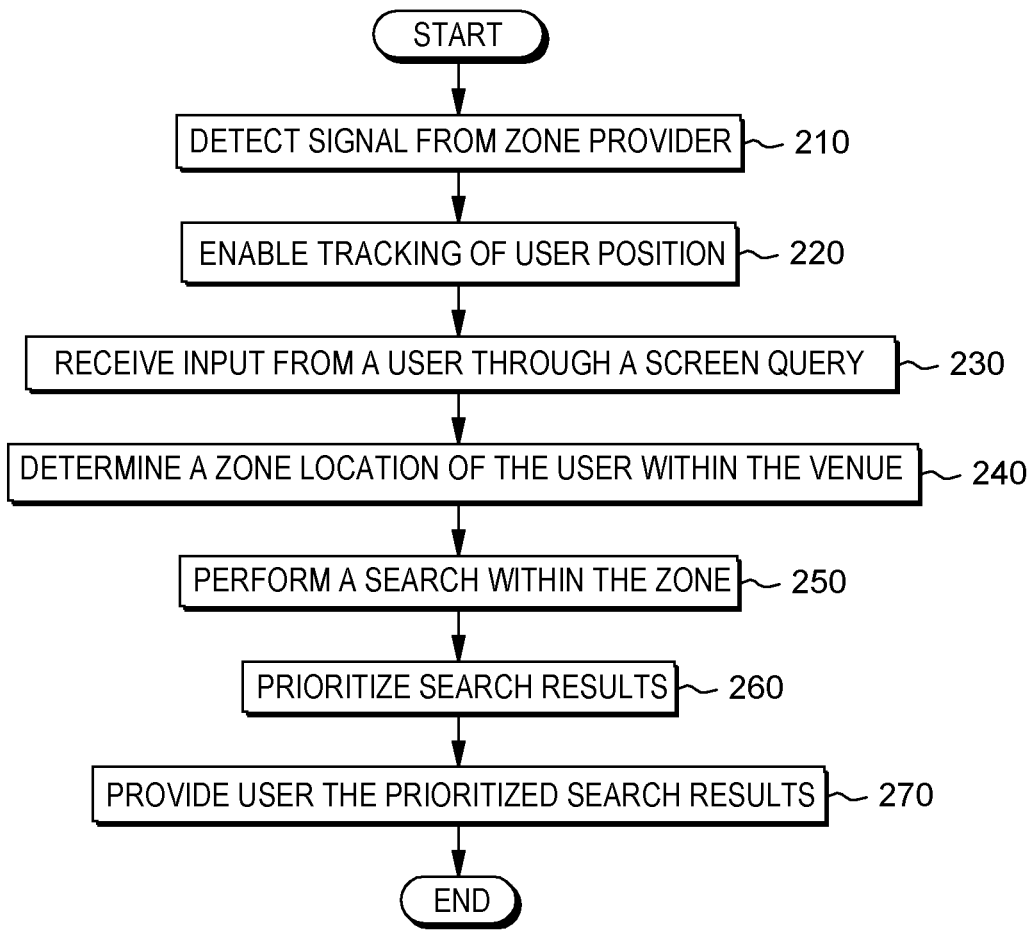
FIG. 2 is a flowchart depicting operational steps of a location shopper program for optimizing information presented to a user, in accordance with the present invention.

FIG. 2 is a flowchart depicting the operational steps of program 200, a program for optimizing a search engine based on the location of a user, in accordance with an embodiment of the present invention.

In step 210, program 200 detects a signal from a zone provider. A zone provider is a source, or owner, of independent Wi-Fi network access points, such as proximity sensors, beacons, or networks of access points that are distributed in a defined space. The zone provider enables captive portals that dictate the usage of access credentials and consent for all users before enabling access to the network of the zone provider. In one embodiment, program 200 establishes a communication link with computing device 110 in response to a shopper entering a shopping environment.

For example, program 200 detects and grants access to computing device 110 within the boundaries of a specified shopping zone. In one embodiment, computing device 110 grants server 120 permission to access programs on computing device 110. For example, GIS 180, on computing device 110, allows server 120 to access, allowing server 120 to track the computing device. In this example, a zone is determined by a short range wireless system that can support many computing devices. The beacons define each zone and contain information specific to that zone. In another embodiment, program 200 detects and grants access to computing device 110 through detecting certain signals periodically emitted by the re-use of standard access point (AP) technologies with a Captive Portal. In yet another embodiment, program 200 detects and grants access to computing device 110 through the use of antennas. In this example, a zone provider uses antennas for the detection of signals in the 2.4 or 5 GHz frequency bands and places the antennas within a bounded space in order to maximize the number of computing devices detected. The antennas are positioned in areas to analyze all signals detected within the bands used by Wi-Fi.

In step 220, program 200 enables tracking of a computing device. In one embodiment, program 200 initiates the tracking of computing device 110 through accessing GIS 180 on computing device 110. As discussed in step 210, the zone provider seeks to maximize the number of computing devices that have access to the zone provider network. There is no security protocol or other prerequisite to computing device 110 and the zone provider network establishing a handshake to allow access to the zone provider network. The GIS contains sensors and/or receivers that program 200 utilizes to determine the location of computing device 110. In this example, program 200 accesses GIS 180 to utilize GPS or triangulation techniques to determine, and update, the physical location of computing device 110 within the zone. In this example, program 200 temporarily registers the computing device of a user to constantly provide and receive feedback on the location of the user in real time. In one embodiment, program 200, via server 120, issues a wireless tag to computing device 110 and receives feedback from GIS 180 of computing device 110.

Program 200 analyzes computing device 110, and multiple computing devices present in the zone, in terms of arrival time, length of visit per zone, paths of movement, and general traffic flow. Program 200 can detect the present physical location of one or more computing devices, such as computing device 110, within the venue based on data received from beacons in the venue. For example, based on the determined, or estimated, distance of the computing device from one beacon to a different strategically placed beacon, program 200 can determine, and continuously update a corresponding location of the computing device in the venue. In another embodiment, program 200 can receive GPS information from GIS 180 of computing device 110 to determine, and continuously update the computing device's location within a subzone or zone.

Figure 3:
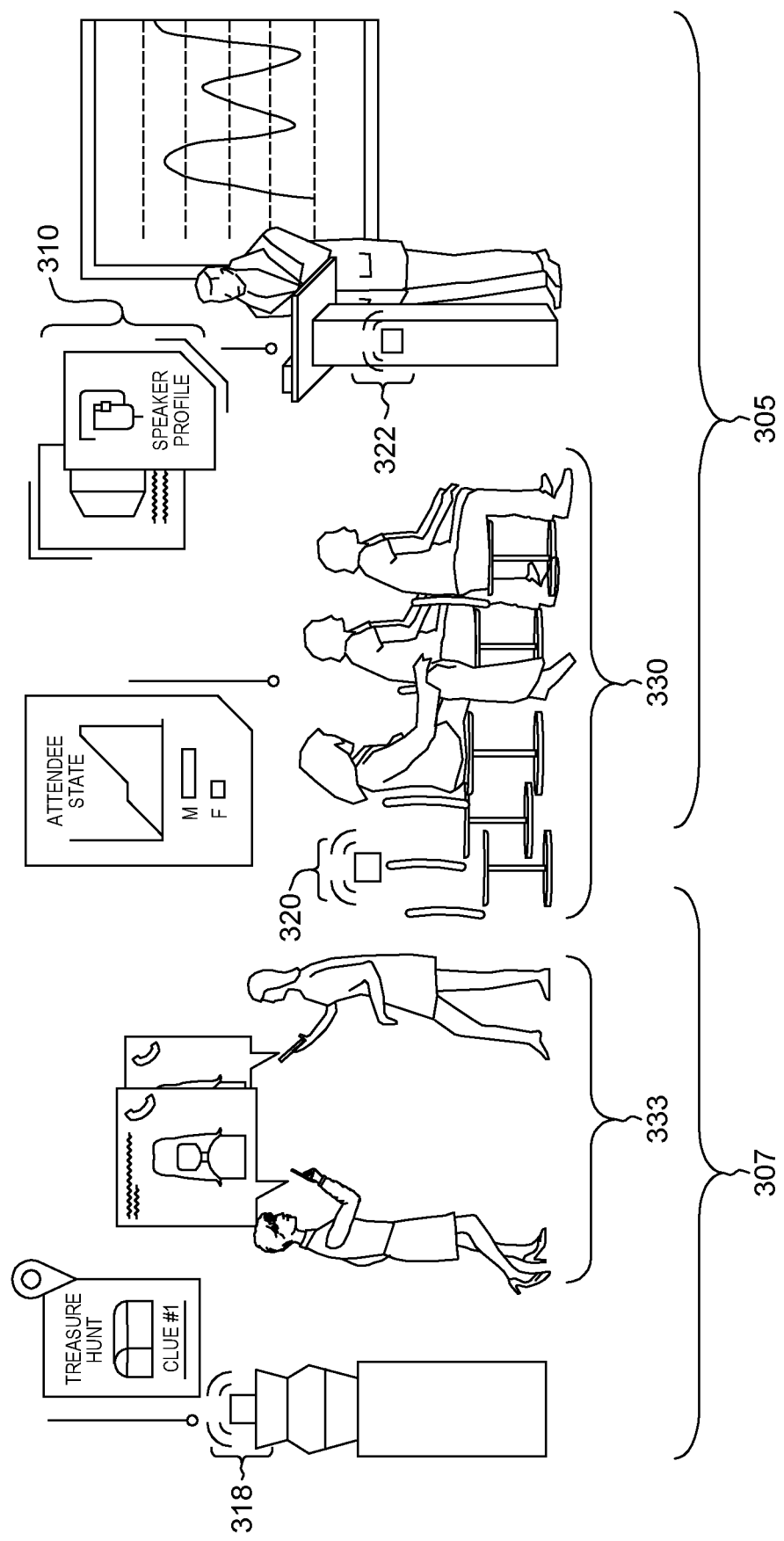
FIG. 3 illustrates an example of location shopper program activating the computing device of a user, in accordance with an embodiment of the present invention.

FIG. 3 illustrates an example of program 200 operating in an environment and performing an action in response to the user entering a multi-zone provider, in accordance with an embodiment of the present invention. In this embodiment, program 200 operates on a server associated with the venue (e.g., server 120) and monitors mobile devices operating within zone boundaries 305 and 307 defined by beacons 318, 320, and 322, to provide information 310 to the computing devices of users 330, and one or more computing devices associated with users 330. Information 310 can include prioritized websites or links to websites related to the venue.

In step 230, program 200 receives input from a user through a screen query. A screen query is the user of computing device 110 manually entering input into the computing device via GUI 130 and web browser 150. An example of a screen query by the user is the user manually browsing, through an HTTP request the user makes to retrieve the website, the website of a zone provider to access a map of the zone provider. In another example, program 200 receives input from the user in the form of a screen query directed to searching tagged products on the website of a zone provider. In an additional example, program 200 receives input of a user entering search terms into a search engine of web browser 150. In one embodiment, program 200, via server 120, receives information from the strategically placed information beacons in the zone. In this example, computing device 110, via server 120, receives commercial product information and a map of the zone that presents tagged metadata of the products in the zone entered into by a user.

In step 240, program 200 determines a zone location of the user within the venue. In one embodiment, program 200, via server 120, determines the zone that the user is in and potentially determines a particular location within the zone. In this example, program 200 utilizes GIS 180, on computing device 110, to determine the sub zone, of a zone, within a particular zone boundary. Program 200 receives information that the user has crossed a zone boundary from the strategically placed beacons in the zone. As discussed in step 220, program 200 determines that computing device 110, and the corresponding user, have entered the zone provider (e.g., the venue) and initiates the tracking of computing device 110 through accessing GIS 180 on computing device 110. The GIS contains other sensors and/or receivers used by program 200 to determine the location of computing device 110. In this example, program 200 accesses GIS 180 to utilize GPS or triangulation techniques to determine, and update, the physical location of computing device 110 within a zone. Program 200 can also determine, or estimate, and continuously update the location of the computing device based upon monitoring changes in the strength of the signal received by the beacon.

FIG. 3 illustrates an example of program 200 managing information provided to a user based on location, in accordance with an embodiment of the present invention. In the example of FIG. 3, program 200 operates on a server computer (e.g., server 120) to manage computing devices within zone boundary 305 and 307 as defined by beacons 318, 320, and 322. Program 200 manages the information that is specific to zone boundary 305 and 307 to provide different information based on prioritizing different search results to users 330, and one or more computing devices associated with users 330, in zone boundary 305, and users 333 in zone boundary 307. Program 200 manages the search results generated in zone boundary 305, for users 330, and one or more computing devices associated with users 330, to nullify any impact on the search results generated in zone boundary 307, for users 333, and one or more computing devices associated with users 333, or any other zone not pictured in FIG. 3.

Information 310 can include the featured speaker's profile, a copy of the speaker's power point presentation, or the medium necessary to register the users in attendance. As in step 210, program 200, on a server (e.g., server 120), detects a Wi-Fi signal that enables program 200 to send and receive feedback from GUI 130 of computing device 110 of a user within zone boundary 305. Program 200 activates the computing device of a user in response to a user traversing zone boundary 305. As in step 230, program 200 receives input in the form of a search query associated with information 310 based on information stored in server 120. In this example, server 120 contains stored data that is specific to keywords, dates, or other information that is relevant to an event. In another embodiment, information that is stored on server 120 may be cross linked to data stored on a computing device (e.g., computing device 110). In this example, server 120 and computing device 110 form a handshake that allows information that is relevant to an event to flow freely between the two devices and permit the two devices to grant access to, provide updates to, and monitor feedback for information related to an event.

In step 250, program 200 performs a search within the zone. In one embodiment, program 200 initiates a search on computing device 110 based on the location of the computing device of the user. In this example, program 200 determines the parameters of the search based upon data and user preferences stored on the computing device of the user. Program 200 initiates the search for a particular item, or list of items, based on the input a user provides through the screen query in step 230 and the location of the computing device of the user in a particular zone boundary. As discussed in step 230, program 200 receives input from the user through a screen query that program 200 uses to conduct a precise search of information, or an item of interest, based upon the user input. Program 200 configures the input to conduct and performs a highly relevant search within the zone.

In another embodiment, program 200 recommends search terms to perform a search within the zone based on the Internet search history of a computing device of a user, relevant data collected from various programs on the computing device of a user, and data related to inventory and/or the information stored on the database of a zone provider. As depicted in FIG. 3, program 200 provides the search terms to users 330, and one or more computing devices associated with users 330, in zone boundary 307 based on data stored in the database. In this example, program 200 recommends search terms that are relevant to the speaker, such as the speaker's personal website, a website containing videos of past speeches, and a link to the speaker's contact information. Program 200 recommends the previously mentioned search terms based on the presence of the user in zone boundary 307, indicating that users 330, and one or more computing devices associated with users 330, are interested in the speaker presenting.

In another embodiment, the user of computing device 110 manually performs a search of the website of the zone provider on computing device 110 while the computing device, and the user, is in a specific zone boundary. In this example, program 200 determines (from step 240) that the computing device 110, and by inference a user, is within a zone boundary based on a feedback loop established between program 200 querying GIS 180, on computing device 110, and grants network access credentials to the computing device upon entry into the zone boundary. Program 200 determines that the zone boundary is associated with metadata from the product catalog of the zone provider. Program 200 uses the metadata associated with a zone boundary based on accessing database 170, on server 120, and accessing storage 160, on computing device 110, to refine the search initiated by the user.

As depicted in FIG. 3, program 200 uses GPS information, from GIS 180 of client device 110, to determine that computing device 110 is located within zone boundary 305. Program 200 accesses GIS 180 to utilize GPS or triangulation techniques to determine, and update, the physical location of computing device 110 within the zone. In this example, program 200 temporarily registers users 330, and one or more computing devices associated with users 330, to constantly provide, and receive feedback, on the location of the user. In another embodiment of example FIG. 3, program 200 utilizes beacon 320 and 322 to determine the location of computing device 110 based upon the proximity of computing device 110 to beacon 320 and 322. Program 200 determines that computing device 110 is within the zone boundary, defined by zone boundary 305 and 307, based upon received location information associated with users 330, and one or more computing devices associated with users 330, from beacon 320.

In an example, instead of receiving input from a user through a screen query as described in step 230, program 200 accesses storage 160, of computing device 110, to receive information of a shopping list saved in storage 160. Program 200 performs a search in the zone for metadata associated with items from the shopping list. In this example, program 200 provides an interactive map of all the zones in the department store, zooms the map out to include the larger map, and populates the interactive map with additional items on the shopping list.

In step 260, program 200 prioritizes search results. In an embodiment, program 200 analyzes information and metadata stored on database 170 to refine the search results in response to the performed search (of step 250). Program 200 determines that the zone boundary includes content associated with metadata of interest to a user and prioritizes the search results that are more relevant to the user based upon the presence of the user in the zone boundary and the results of the previous search. Program 200 organizes the returned data and prioritizes the returned data by assigning a higher priority to the metadata, based upon the user, the current location of the shopper, and the set of provided search terms used to perform the search. In an example, program 200 prioritizes the search results using the information, by the search engine, to create a set of results that have higher priority relative to other possible search results from other metadata specific to another zone boundary based upon a combination the data accessed in storage 160, the location of a user, the history of previous searches performed by program 200, the preferences of the beacon provider, the preferences of the user, and information from other relevant applications on the computing device of a user.

As depicted in FIG. 3, zone boundary 307, as defined by beacon 318, is a separate and distinct zone boundary from zone boundary 305. Program 200 obtains the results of a search query (a search performed in step 250), then uses the determined zone location of the user within the venue (from step 240), and program 200 analyzes the input provided from the user through the screen query (from step 230) to identify search results that are associated with the user's location. For example, in zone boundary 305, program 200 prioritizes the results based on the input provided by the user through a screen query (step 230), and program 200 prioritizes results based on the information associated with the speaker (e.g., information 310). In zone boundary 307, program 200 prioritizes the results based on metadata associated with content located in zone boundary 307 (e.g., scavenger hunt, etc.), and the input provided by the user (as described in step 230) to prioritize results.

For example, program 200, via a feedback exchange between database 170 on server 120 and storage 160 on computing device 110, starts a mobile application and prioritizes the search results from a website in conjunction with the commercial product information on database 170, and the preferences, or past purchases of the user on storage 160, and presents the tagged metadata of the products in the zone entered into by a user. In this example, the computing device of the user presents the user a website associated with the zone and prioritizes search result information from the website specific to shopping deals, coupons, promotional sales, newly acquired products, and information related to the newly acquired products within the zone occupied by the user.

In step 270, program 200 provides the user prioritized search results. In an embodiment, program 200 provides data organized in a manner to be relevant to a user. Relevant data is information that is useful to a user. In an example, program 200, via server 120, accesses web browser 150 to provide results to the user. In an example, a proprietor of server 120 provides the user of computing device 110 with biographical information on an invited speaker. In an example embodiment, the user enters a search query into computing device 110 that relates to a speaker present in the zone (e.g., "Biography of John Smith"). In this example, a search engine returns a plurality of results that are relevant to the entered query regarding the speaker. Program 200 can prioritize the received search results (in step 260) based on the determined location of the user. Then, program 200 can provide the user with prioritized search results, which include biographical information of the speaker, based on the users determined zone location.

The user of computing device 110 would browse the internet, or search the internet for information that is unrelated to what is in the zone that the user occupies. Program 200, recognizing that the user is within a zone boundary, prioritizes the information that is relevant to the zone in a search performed by a user and presents the prioritized result to the user of computing device 110.

In an example embodiment, program 200 provides different results to users 330, and one or more computing devices associated with users 330, and users 333, and one or more computer devices associated with users 333, based upon the presence of users 330, and one or more computing devices associated with users 330, in zone boundary 305, as compared to the presence of users 333, and one or more devices associated with users 333, in zone boundary 307. In an example, as depicted in FIG. 3, users 330, and one or more computing devices associated with users 330, in zone boundary 305 will receive prioritized search results directed to a speaker's biography (e.g., from database 170 on server 120), whereas users 333, and one or more devices associated with users 333, will receive different prioritized search results than users 330, and one or more computing devices associated with users 330, because users 333, and one or more devices associated with users 333, are located within zone boundary 307.

Figure 4:
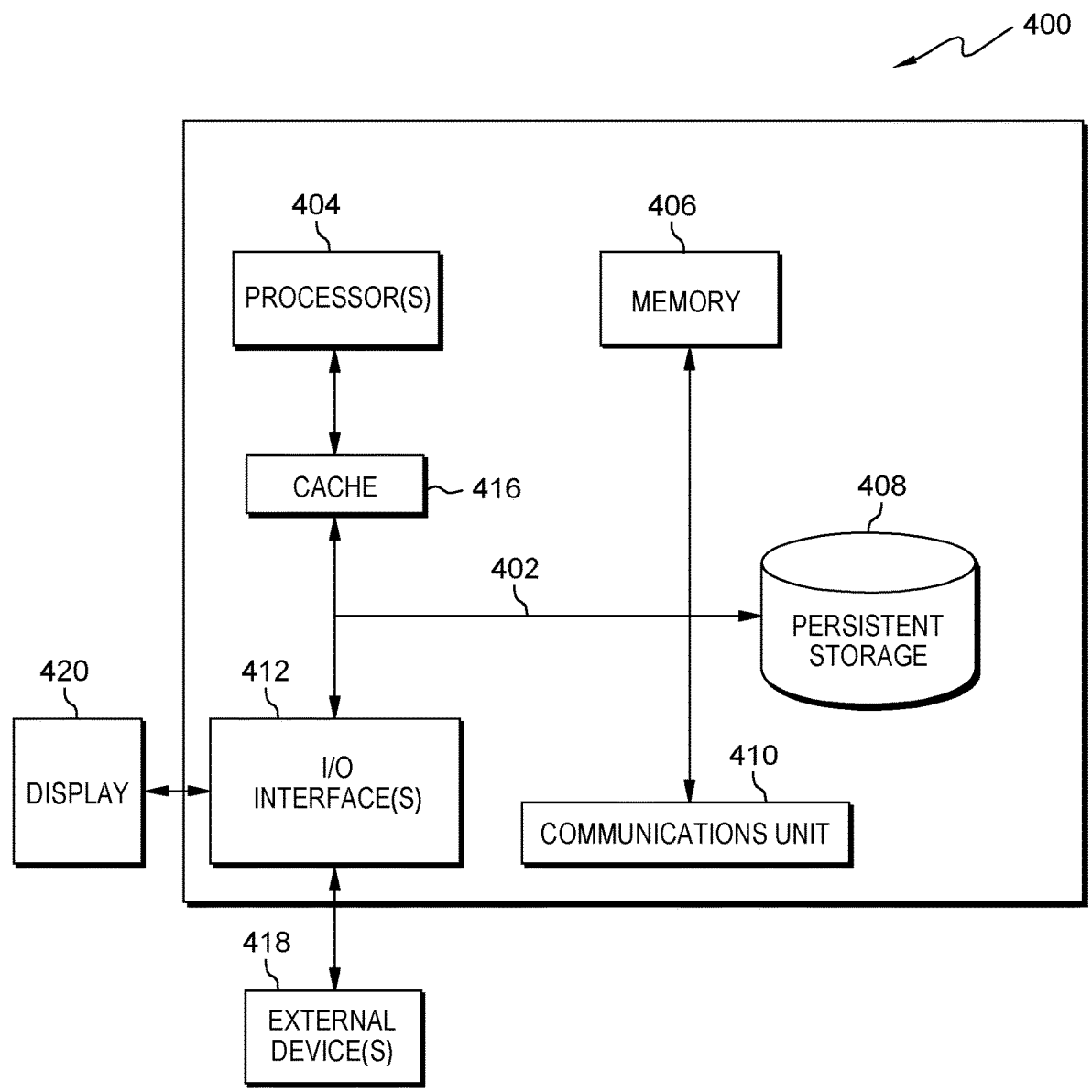
FIG. 4 is a block diagram of components of a computer system, such as the server computer of FIG. 1, in accordance with an embodiment of the present invention.

FIG. 4 depicts a block diagram of components of server 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Program 200 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program 200 may be downloaded to persistent storage 408 through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for prioritizing search engine results based on a current location of a user, the method comprising:
   determining, by one or more processors, a computing device is within a communication range of a beacon, based on monitoring connectivity of the computing device to a local area network;
   receiving, input from a user entering search terms into a search engine of a web browser while the computing device is within the communication range of the beacon;
   identifying a set of search results based on the input, the search results includes links to websites related to the input;
   prioritizing, by one or more processors, the set of search results according to relatedness of the links to a location within the communication range of the beacon, the location associated with certain registrants having an online presence; and
   displaying on the computing device prioritized search results including a set of links to websites related to the certain registrants.

2. The method of claim 1, wherein determining the computing device is within a communication range of the beacon further comprises:
   registering, by one or more processors, a globally unique identifier of the computing device with a zone provider associated with the beacon; and
   updating, by one or more processors, a position of the computing device as the connectivity of the computing devices changes from a first beacon to a second beacon.

3. The method of claim 1, wherein prioritizing results of the search engine query further comprises:
   identifying, by one or more processors, metadata associated with the content indicates relatedness to the location within the communication range of the beacon; and
   prioritizing, by one or more processors, the results of the search engine query is based on the results being tagged with metadata indicating a location matching the communication range of the beacon.

4. The method of claim 3, wherein:
   the communication range is a first communication range and the beacon is a first beacon; and
   identifying metadata associated with the content comprises:
     responsive to determining the computing device is located within a second communication range of a second beacon, identifying, by one or more processors, metadata associated with content located within the second communication range,
   wherein:
   the first communication range and the second communication range include different geographic areas; and
   the second beacon is located within the second communication range.

5. The method of claim 1, further comprising:
   assigning, by one or more processes, a higher priority to a first search result within the results that includes a first content related to the location within the communication range of the beacon, as compared to a second search result within the results that includes a second content related to the location within the communication range of the beacon, based on user preferences associated with a user having access to the computing device,
   wherein the first search result is associated with metadata that is of interest to the user based on the user preferences.

6. The method of claim 1, wherein the beacon is broadcasting equipment of a wireless communications system transmitting at a frequency range of 2.4 to 5 gigahertz.

7. A computer program product for prioritizing search engine results based on a current location of a user, the computer program product comprising:
one or more computer readable tangible storage media and program instructions stored on at least one of the one or more computer readable storage media, the program instructions readable/executable by one or more computer processors and further comprising:
program instructions to determine a computing device is within a communication range of a beacon, based on monitoring connectivity of the computing device to a local area network;
program instructions to receive input from a user entering search terms into a search engine of a web browser while the computing device is within the communication range of the beacon;
program instructions to identify a set of search results based on the input, the search results includes links to websites related to the input;
program instructions to prioritize the set of search results according to relatedness of the links to a location within the communication range of the beacon, the location associated with certain registrants having an online presence; and
program instructions to display on the computing device prioritized search results including a set of links to websites related to the certain registrants.

8. The computer program product of claim 7, further comprising program instructions, stored on the one or more computer readable storage media, which when executed by a processor, cause the processor to:
register a globally unique identifier of the computing device with a zone provider associated with the beacon; and
update a position of the computing device as the connectivity of the computing devices changes from a first beacon to a second beacon.

9. The computer program product of claim 7, wherein prioritizing results of the search further comprises program instructions, stored on the one or more computer readable storage media, which when executed by a processor, cause the processor to:
identify metadata associated with the content indicates relatedness to the location within the communication range of the beacon; and
prioritize the results of the search engine query is based on the results being tagged with metadata indicating a location matching the communication range of the beacon.

10. The computer program product of claim 9, wherein:
the communication range is a first communication range and the beacon is a first beacon; and
identifying metadata associated with the content comprises program instructions, stored on the one or more computer readable storage media, which when executed by a processor, cause the processor to:
responsive to determining the computing device is located within a second communication range of a second beacon, identifying, by one or more processors, metadata associated with content located within the second communication range
wherein:
the first communication range and the second communication range include different geographic areas; and
the second beacon is located within the second communication range.

11. The computer program product of claim 7 further comprising program instructions, stored on the one or more computer readable storage media, which when executed by a processor, cause the processor to:
determine recommended search terms based on a user profile corresponding to the computing device, user preferences associated with a user, and the location within the communication range of the beacon.

12. The computer program product of claim 7 further comprising program instructions, stored on the one or more computer readable storage media, which when executed by a processor, cause the processor to:
assign a higher priority to a first search result within the results that includes a first content related to the location within the communication range of the beacon, as compared to a second search result within the results that includes a second content related to the location within the communication range of the beacon, based on user preferences associated with a user having access to the computing device,
wherein the first search result is associated with metadata that is of interest to the user based on the user preferences.

13. The computer program product of claim 7, wherein the beacon is broadcasting equipment of a wireless communications system transmitting at a frequency range of 2.4 to 5 gigahertz.

14. A computer system comprising:
one or more computer processors;
one or more computer readable storage media; and
program instructions to determine a computing device is within a communication range of a beacon, based on monitoring connectivity of the computing device to a local area network;
program instructions to receive input from a user entering search terms into a search engine of a web browser while the computing device is within the communication range of the beacon;
program instructions to identify a set of search results based on the input, the search results includes links to websites related to the input;
program instructions to prioritize the set of search results according to relatedness of the links to a location within the communication range of the beacon, the location associated with certain registrants having an online presence; and
program instructions to display on the computing device prioritized search results including a set of links to websites related to the certain registrants.

15. The computer system of claim 14, further comprising program instructions, stored on the one or more computer readable storage media, which when executed by a processor, cause the processor to:
register a globally unique identifier of the computing device with a zone provider associated with the beacon; and
update a position of the computing device as the connectivity of the computing devices changes from a first beacon to a second beacon.

16. The computer system of claim 14, wherein prioritizing results of the search further comprises program instructions, stored on the one or more computer readable storage media, which when executed by a processor, cause the processor to:
identify metadata associated with the content indicates relatedness to the location within the communication range of the beacon; and prioritize the results of the search engine query is based on the results being tagged with metadata indicating a location matching the communication range of the beacon.

17. The computer system of claim 16, wherein:

the communication range is a first communication range and the beacon is a first beacon; and identifying metadata associated with the content comprises program instructions, stored on the one or more computer readable storage media, which when executed by a processor, cause the processor to:

responsive to determining the computing device is located within a second communication range of a second beacon, identifying, by one or more processors, metadata associated with content located within the second communication range wherein:

the first communication range and the second communication range include different geographic areas; and the second beacon is located within the second communication range.

18. The computer system of claim 14 further comprising program instructions, stored on the one or more computer readable storage media, which when executed by a processor, cause the processor to:

determine recommended search terms based on a user profile corresponding to the user, user preferences associated with the user, and a current zone location of the user within the venue.

19. The computer system of claim 14, wherein the beacon is broadcasting equipment of a wireless communications system transmitting at a frequency range of 2.4 to 5 gigahertz.

* * * * *